United States Patent
Jung et al.

(10) Patent No.: US 10,123,370 B2
(45) Date of Patent: *Nov. 6, 2018

(54) DEVICE-TO-DEVICE (D2D) OPERATION METHOD CARRIED OUT BY TERMINAL IN RRC CONNECTION STATE IN WIRELESS COMMUNICATION SYSTEM, AND TERMINAL USING THE METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/305,068

(22) PCT Filed: Apr. 23, 2015

(86) PCT No.: PCT/KR2015/004076
§ 371 (c)(1),
(2) Date: Oct. 18, 2016

(87) PCT Pub. No.: WO2015/163714
PCT Pub. Date: Oct. 29, 2015

(65) Prior Publication Data
US 2017/0188408 A1     Jun. 29, 2017

Related U.S. Application Data

(60) Provisional application No. 61/988,928, filed on May 6, 2014, provisional application No. 61/983,999, filed
(Continued)

(51) Int. Cl.
*H04W 72/04* (2009.01)
*H04W 76/14* (2018.01)
(Continued)

(52) U.S. Cl.
CPC ........... *H04W 76/14* (2018.02); *H04W 72/02* (2013.01); *H04W 76/10* (2018.02); *H04W 76/18* (2018.02);
(Continued)

(58) Field of Classification Search
CPC . H04W 76/027; H04W 88/08; H04W 76/023; H04W 76/028; H04W 76/046;
(Continued)

(56) References Cited

U.S. PATENT DOCUMENTS

2013/0083779 A1   4/2013 Ahn et al.
2013/0109301 A1*  5/2013 Hakola ................. H04W 76/14
                                                  455/39
(Continued)

FOREIGN PATENT DOCUMENTS

KR   1020130035964 A   4/2013
WO   2013162333 A1    10/2013
(Continued)

OTHER PUBLICATIONS

3rd Generation Partnership Project, "Technical Specification Group Radio Access Network; Study on LTE Device to Device Proximity Services; Radio Aspects (Release 12)", 3GPP TR 36.843 V1.2.0, Feb. 2014, 49 pages.
(Continued)

*Primary Examiner* — Walli Butt
(74) *Attorney, Agent, or Firm* — Lee, Hong, Degerman, Kang & Waimey

(57) ABSTRACT

Provided are a device-to-device (D2D) operation method carried out by a terminal in an RRC connection state in a wireless communication system, and a terminal using the method. The method is characterized by: determining whether a communication link with a base station is problematic; and transmitting a D2D signal using an exception
(Continued)

resource, when the communication link with the base station is determined to be problematic.

8 Claims, 20 Drawing Sheets

Related U.S. Application Data on Apr. 24, 2014, provisional application No. 61/983,439, filed on Apr. 23, 2014.

(51) Int. Cl.
| | |
|---|---|
| *H04W 76/10* | (2018.01) |
| *H04W 76/27* | (2018.01) |
| *H04W 76/20* | (2018.01) |
| *H04W 76/19* | (2018.01) |
| *H04W 76/18* | (2018.01) |
| *H04W 72/02* | (2009.01) |
| *H04W 88/02* | (2009.01) |
| *H04W 88/08* | (2009.01) |
| *H04W 8/00* | (2009.01) |

(52) U.S. Cl.
CPC ........... *H04W 76/19* (2018.02); *H04W 76/20* (2018.02); *H04W 76/27* (2018.02); *H04W 8/005* (2013.01); *H04W 88/02* (2013.01); *H04W 88/08* (2013.01)

(58) Field of Classification Search
CPC ..... H04W 88/02; H04W 76/18; H04W 76/19; H04W 76/27; H04W 76/14
See application file for complete search history.

(56) References Cited

U.S. PATENT DOCUMENTS

| | | | |
|---|---|---|---|
| 2013/0324114 A1 | 12/2013 | Raghothaman et al. | |
| 2015/0264677 A1* | 9/2015 | He | H04W 72/02 370/312 |
| 2015/0264733 A1* | 9/2015 | Guo | H04W 48/06 370/329 |
| 2015/0271763 A1 | 9/2015 | Balachandran et al. | |
| 2015/0365994 A1* | 12/2015 | Yu | H04W 72/1268 370/336 |
| 2016/0374135 A1* | 12/2016 | Martin | H04W 72/04 |
| 2017/0026939 A1* | 1/2017 | Fodor | H04L 5/0073 |
| 2017/0188403 A1* | 6/2017 | Jung | H04W 76/023 |
| 2017/0188408 A1 | 6/2017 | Jung et al. | |
| 2017/0353848 A1* | 12/2017 | He | H04L 5/0069 |

FOREIGN PATENT DOCUMENTS

| | | |
|---|---|---|
| WO | 2014010988 A1 | 1/2014 |
| WO | 2014047905 A1 | 4/2014 |
| WO | 2015142113 | 9/2015 |
| WO | 2015143170 | 9/2015 |

OTHER PUBLICATIONS

3rd Generation Partnership Project, "Technical Specification Group Radio Access Network; Evolved Universal Terrestrial Radio Access (E-UTRA); User Equipment (UE) procedures in idle mode (Release 8)", 3GPP TS 36.304 V8.5.0, Mar. 2009, 30 pages.
U.S. Appl. No. 15/305,067, Office Action dated Feb. 7, 2018, 21 pages.
European Patent Office Application Serial No. 15783108.2, Search Report dated Nov. 20, 2017, 13 pages.
Interdigital Communications, "Mode Selection and Resource Pool Selection for D2D UEs", 3GPP TSG RAN WG2 Meeting #85bis, R2-141695, Apr. 2014, 5 pages.
Samsung, "Definitions of in-coverage, out-of-coverage, edge-of-cell coverage", 3GPP TSG RAN WG1 Meeting #76bis, R1-141309, Apr. 2014, 3 pages.
Sony, "D2D Resource Allocation Mode Selection", 3GPP TSG RAN WG2 Meeting #85bis, R2-141300, Apr. 2014, 4 pages.
QUALCOMM, "Control for D2D broadcast communication", 3GPP TSG RAN WG1 Meeting #76bis, R1-141448, Apr. 2014, 7 pages.
United States Patent and Trademark Office U.S. Appl. No. 15/304,202, Office Action dated Apr. 17, 2018, 19 pages.

\* cited by examiner

DEVICE-TO-DEVICE (D2D) OPERATION METHOD CARRIED OUT BY TERMINAL IN RRC CONNECTION STATE IN WIRELESS COMMUNICATION SYSTEM, AND TERMINAL USING THE METHOD

CROSS-REFERENCE TO RELATED APPLICATIONS

This application is the National Stage filing under 35 U.S.C. 371 of International Application No. PCT/KR2015/004076, filed on Apr. 23, 2015, which claims the benefit of U.S. Provisional Applications No. 61/983,439, filed on Apr. 23, 2014, 61/983,999, filed on Apr. 24, 2014 and 61/988,928, filed on May 6, 2014, the contents of which are all hereby incorporated by reference herein in their entirety.

BACKGROUND OF THE INVENTION

Field of the Invention

The present invention relates to wireless communications, and more particularly, to a device-to-device (D2D) operation method carried out by a terminal in an RRC connection state in a wireless communication system and a terminal using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, a terminal may perform a D2D operation with another terminal, while being radio resource control (RRC)-connected to a specific cell. In this case, the terminal may be assigned a resource scheduled by the specific cell for signal transmission based on the D2D operation. However, a wireless environment may dramatically change depending on the movement of the terminal, and accordingly a wireless connection state of the terminal with the specific cell may become drastically poor. In this problematic situation, the terminal may have difficulty in being allocated a resource for the D2D operation scheduled by the specific cell, resulting in a D2D operation stoppage. Since the D2D operation is mainly for public safety, such a problem needs to be resolved to achieve the reliability of the D2D operation.

SUMMARY OF THE INVENTION

Accordingly, an object of the present invention is to a device-to-device (D2D) operation method carried out by a terminal in a wireless communication system and a terminal using the same.

In an aspect, a method for a device-to-device (D2D) operation performed by a user equipment (UE) in a wireless communication system is provide. The method comprising determining whether a problem is present in a communication link with a base station and transmitting a D2D signal using an exceptional resource when it is determined that the problem is present in the communication link with the base station.

The determining whether the problem in the communication link may determine that the problem is present in the communication link when the UE detects a physical layer problem with respect to a primary cell or declares radio link failure.

The UE may determine that the problem is present in the communication link with the base station when a timer started upon detecting a physical layer problem, a timer started when the UE performs a cell selection process after declaring radio link failure, or a timer started when the UE selects a cell and transmits an RRC connection reestablishment request message after declaring radio link failure operates.

The exceptional resource may be indicated by system information.

The system information may be broadcast by a primary cell of the UE or a cell in which the UE starts an RRC connection reestablishment procedure.

The D2D signal may be control information or data that is used in D2D communication.

The UE may be in a radio resource control (RRC) connected state.

The UE may stop using the exceptional resource when determining that the communication link with the base station recovers.

Recovery of the communication link may mean that a physical layer problem is resolved or an RRC connection reestablishment state with respect to the base station is completed.

In another aspect, a user equipment (UE) is provided. The UE comprises a radio frequency (RF) unit that transmits and receives a radio signal and a processor connected to the RF unit to operate, wherein the processor that determines whether a problem is present in a communication link with a base station, and transmits a device-to-device (D2D) signal using an exceptional resource when it is determined that the problem is present in the communication link with the base station.

According to the present invention, even though a terminal that is RRC connected to a specific cell has a poor wireless environment with the specific cell while performing a D2D operation, the terminal may continue to perform the D2D operation without stopping the D2D operation. Therefore, the operational reliability of a network supporting the D2D operation may be enhanced.

DESCRIPTION OF EXEMPLARY EMBODIMENTS

Figure 1:
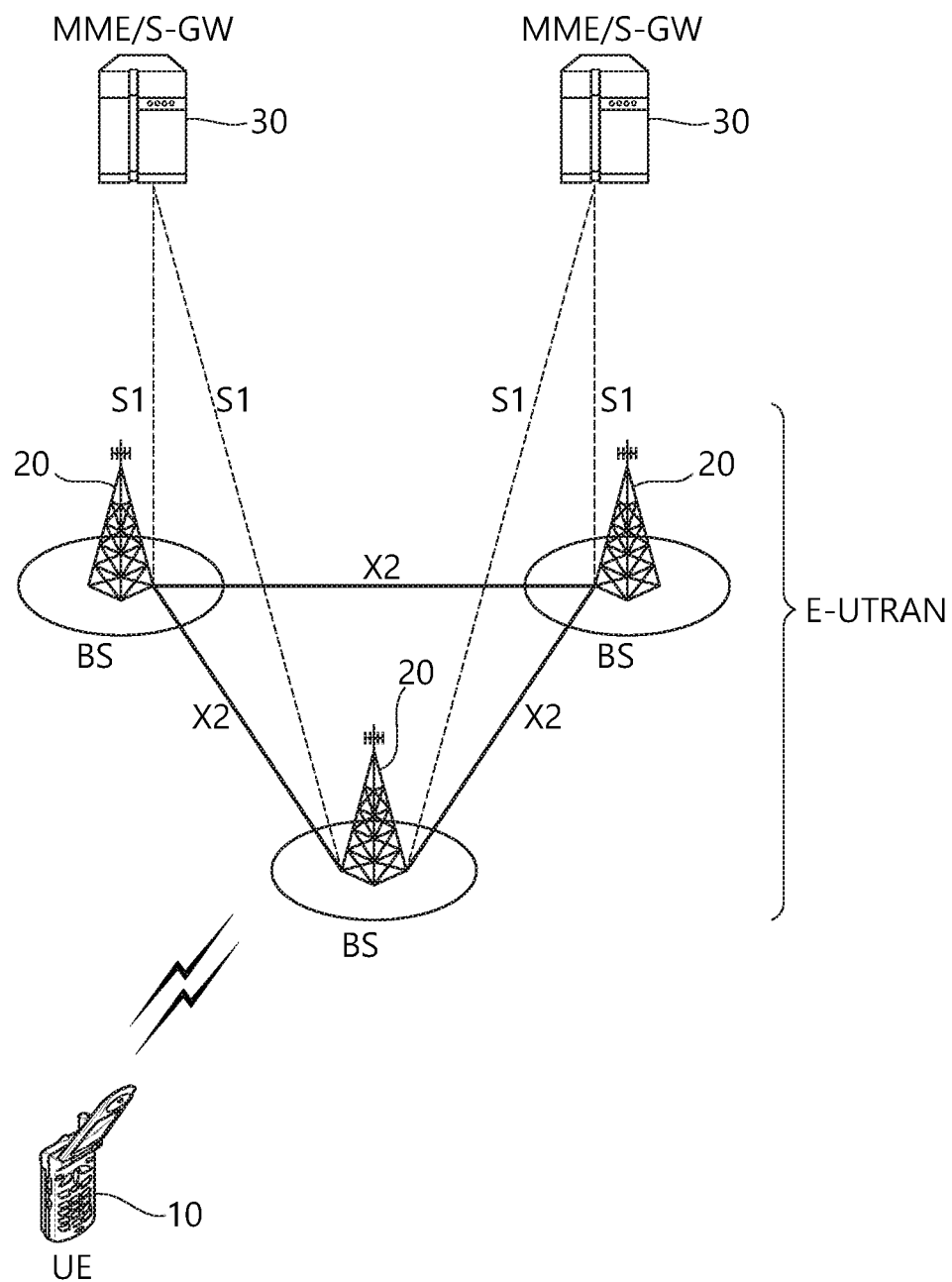
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
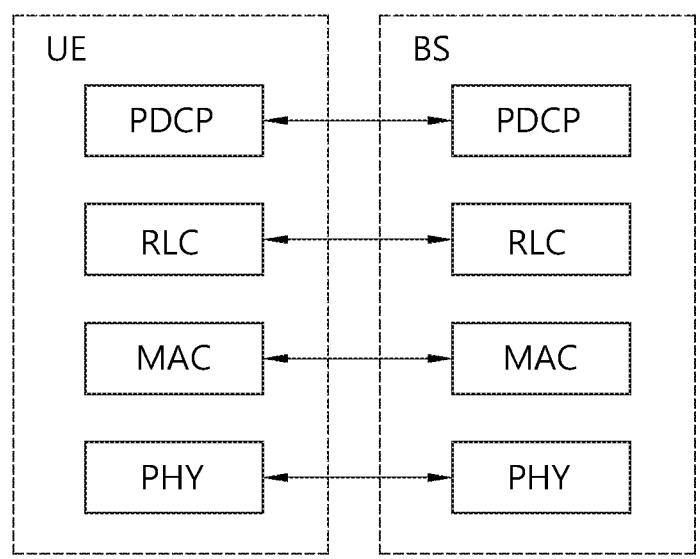
FIG. 2 is a diagram showing a wireless protocol architecture for a user plane.
Figure 3:
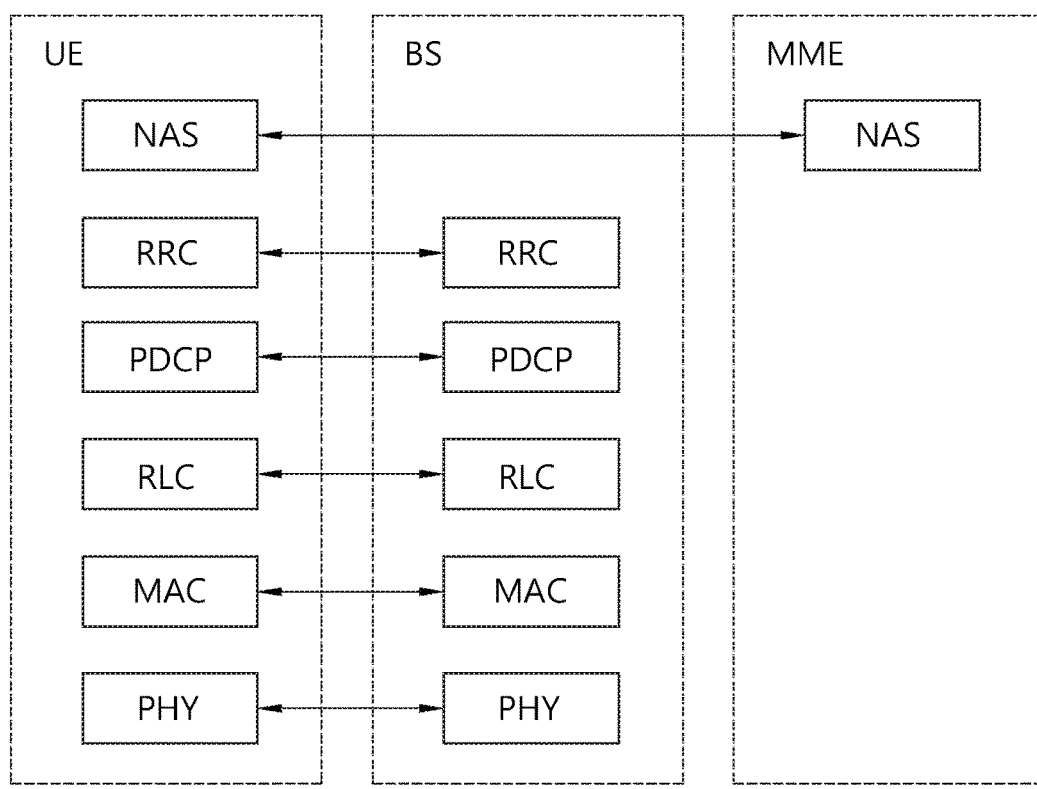
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
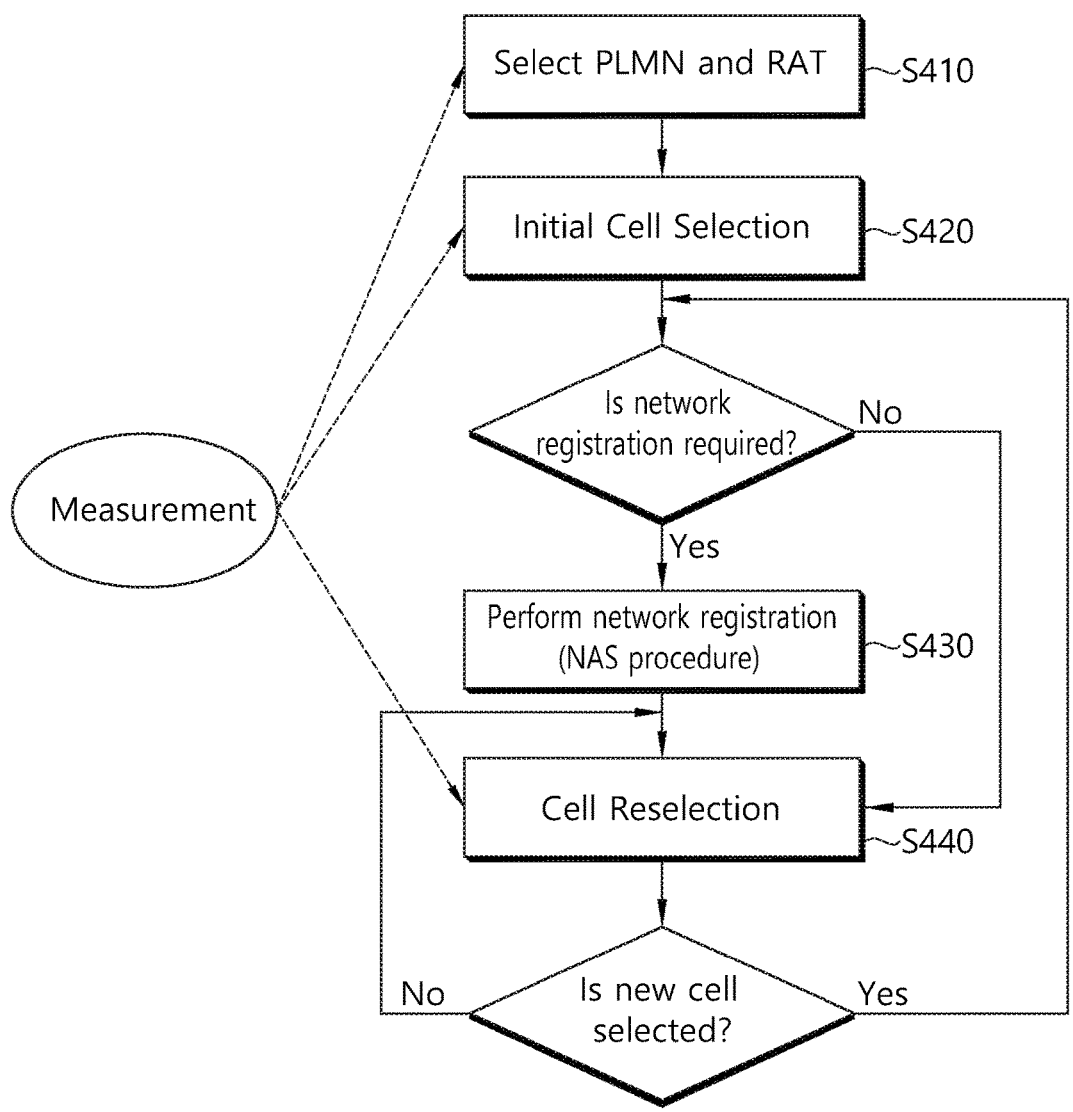
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
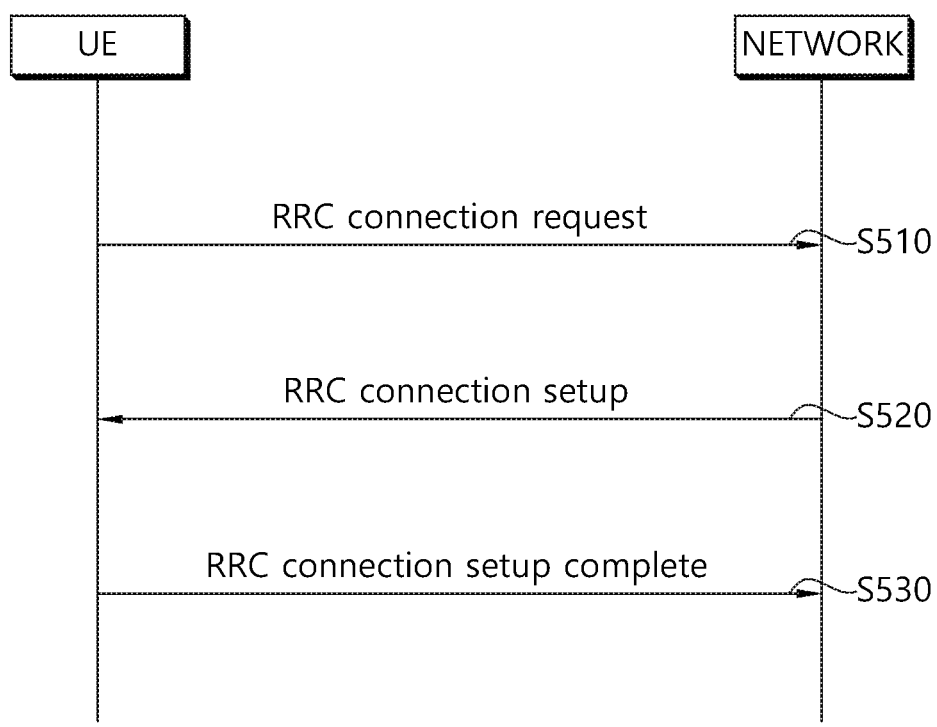
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
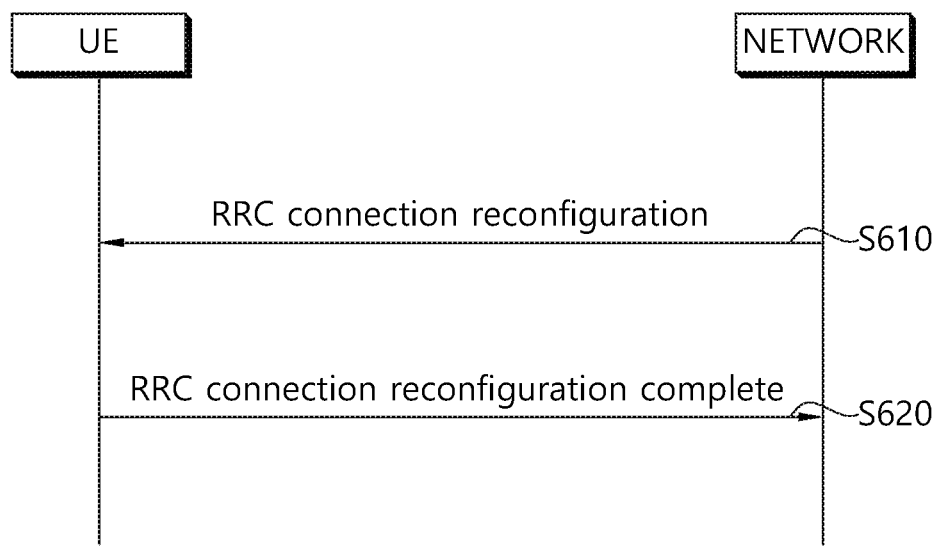
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below.

$$\text{Srxlev} > 0 \text{ AND } \text{Squal} > 0, \qquad \text{[Equation 1]}$$

where:

$$\text{Srxlev} = Q_{rxlevmeas} - (Q_{rxlevmin} + Q_{rxlevminoffset}) - P_{compensation},$$

$$\text{Squal} = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
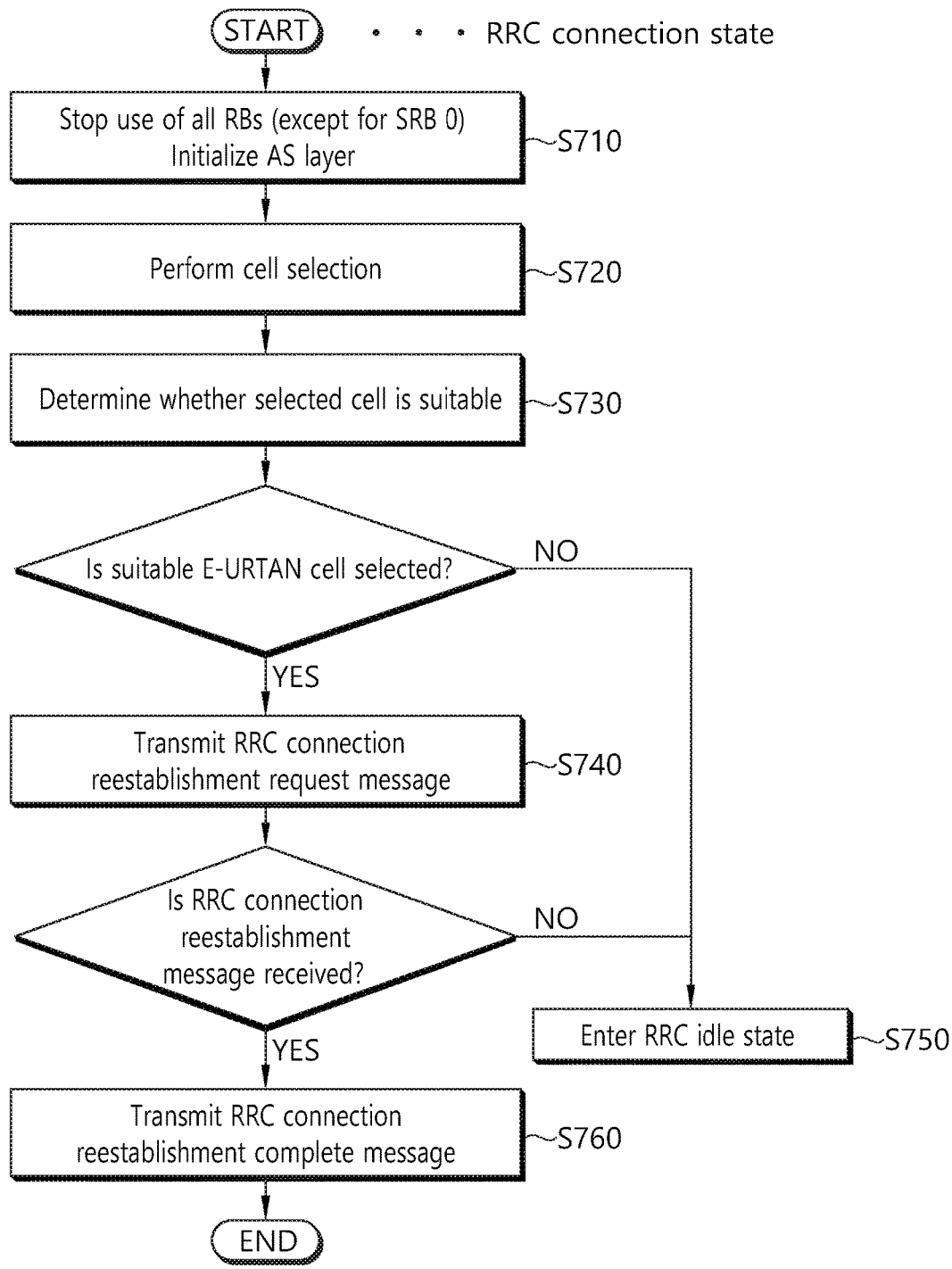
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
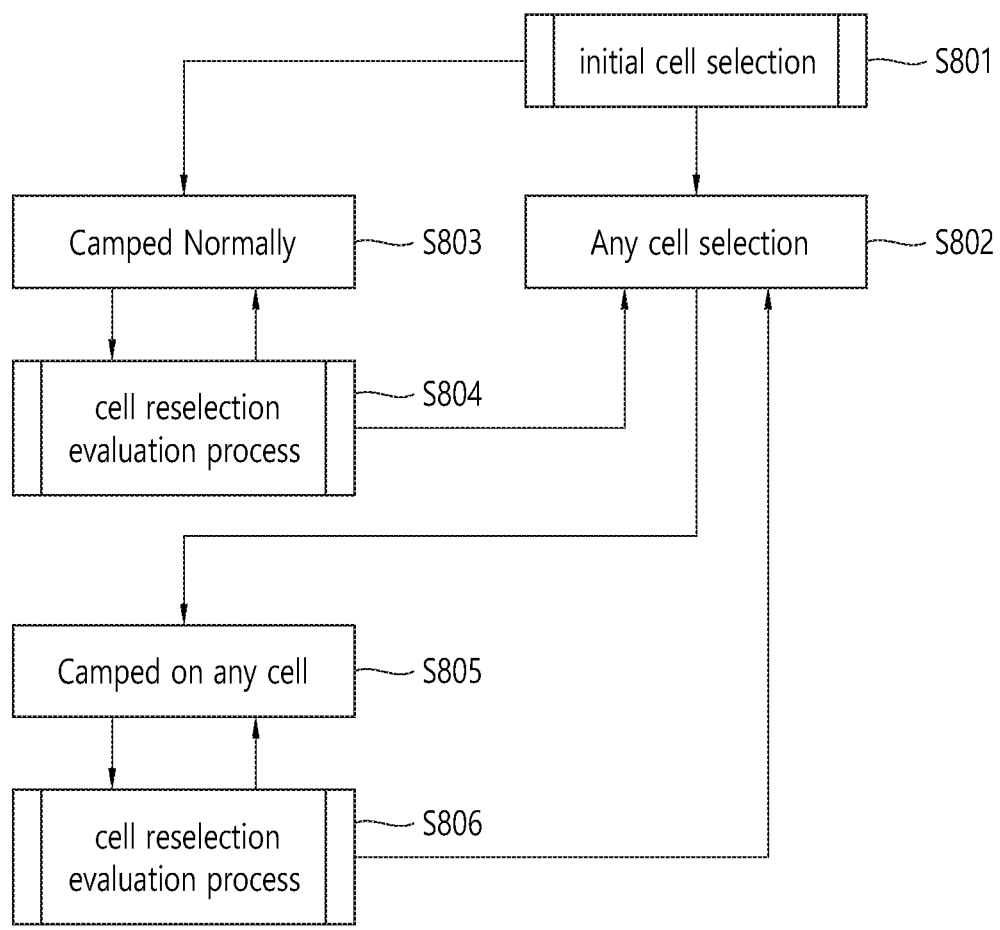
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
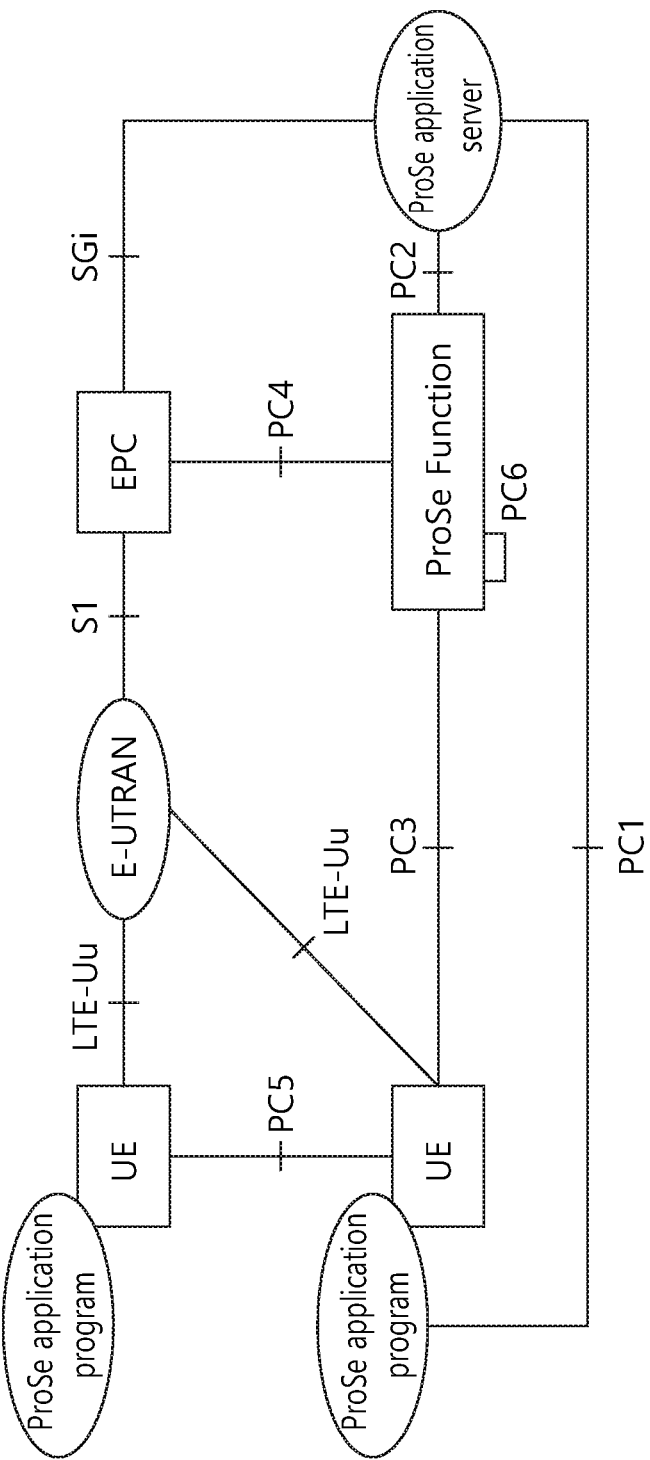
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
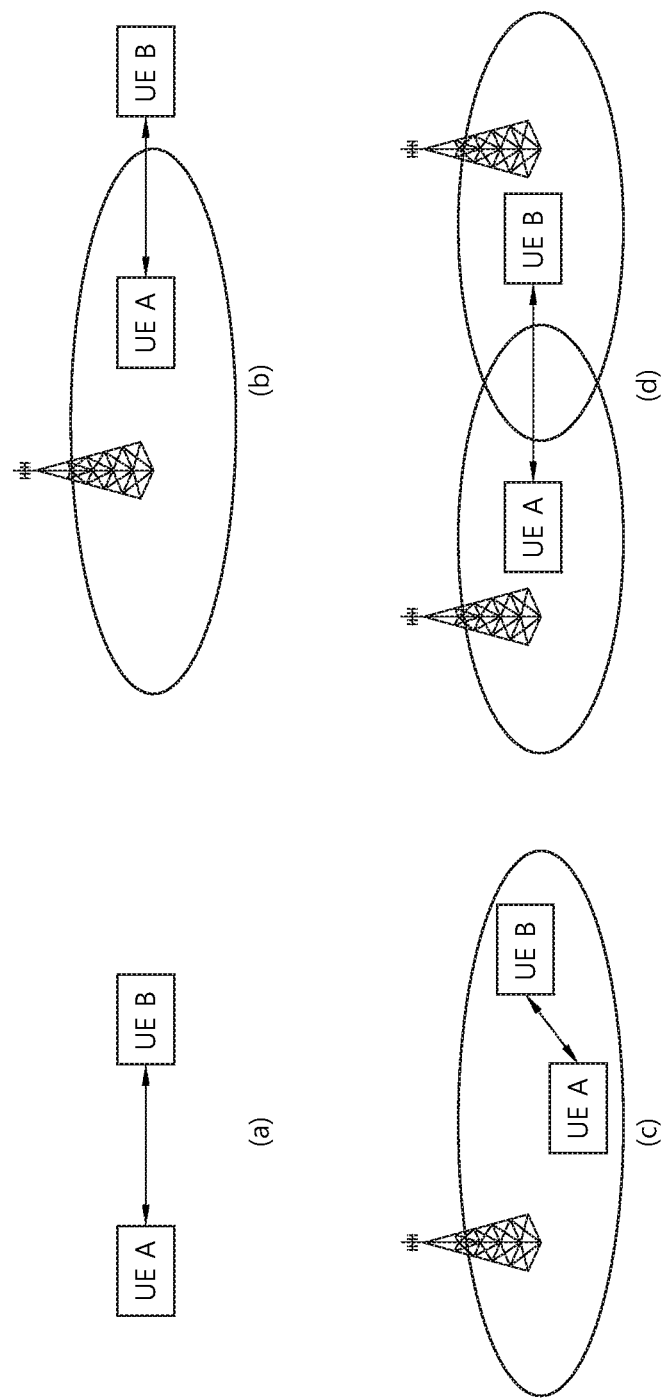
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
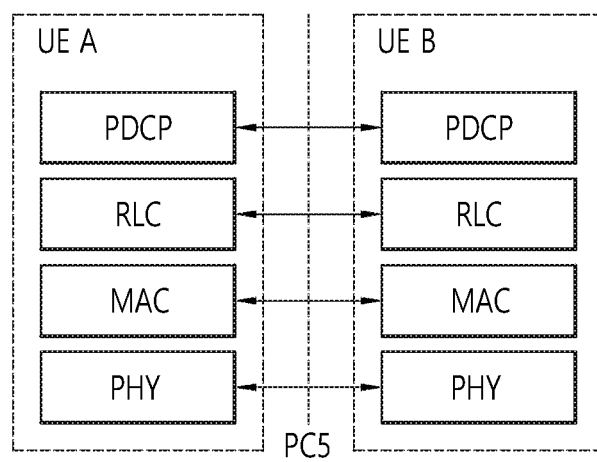
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
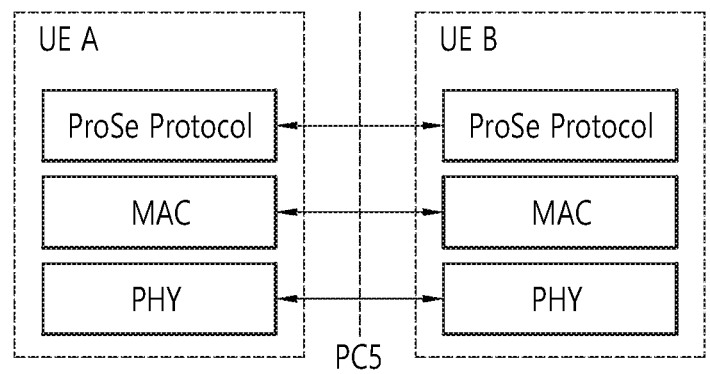
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 13:
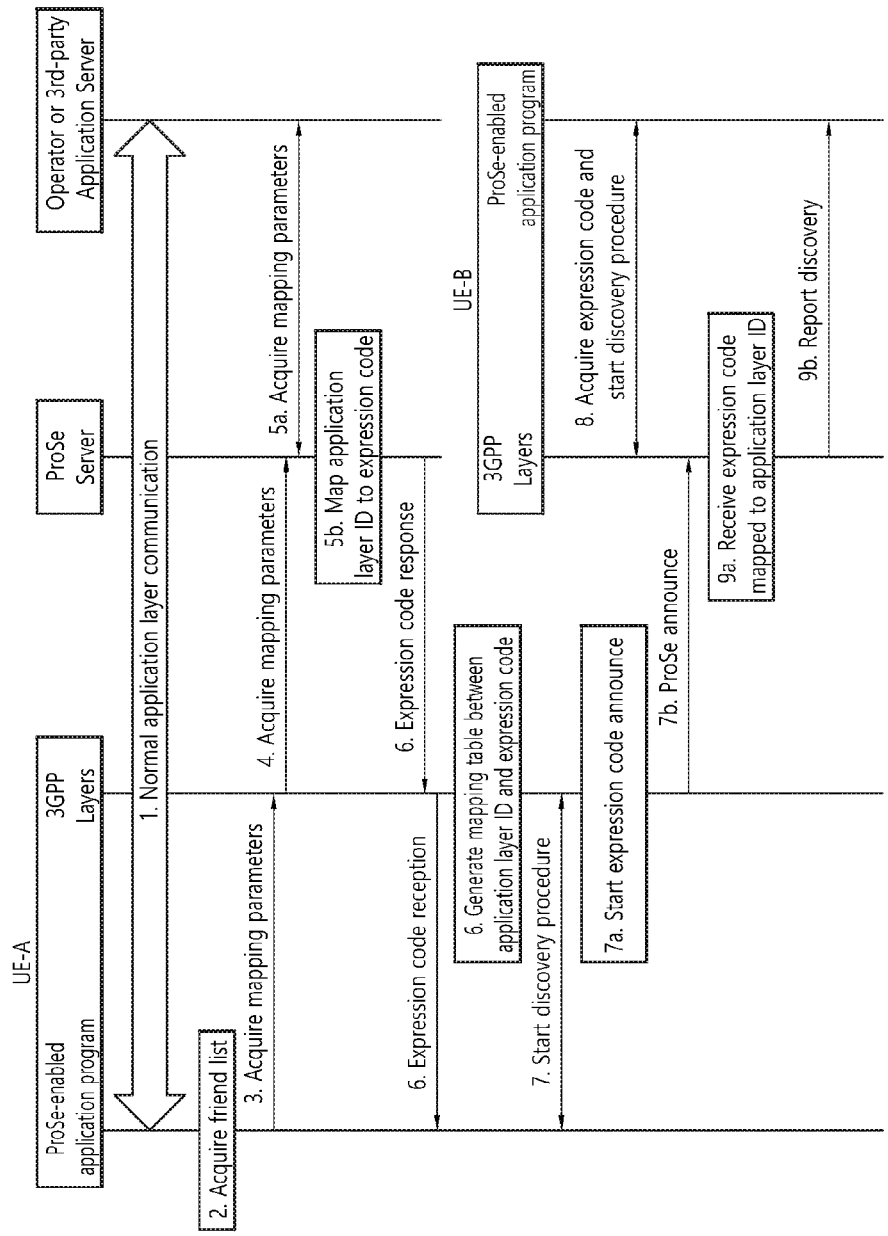
FIG. 13 illustrates an embodiment of a ProSe direct discovery procedure.

FIG. 13 illustrates an embodiment of a ProSe direct discovery procedure.

Referring to FIG. 13, it is assumed in a terminal A and a terminal B that a ProSe-enabled application program is operated, and the terminal A and the terminal B are configured in a friend relationship to each other, that is, a relationship capable of allowing D2D communication with each other in the application program. Hereinafter, the terminal B may be expressed as a friend of the terminal A. For example, the application program may be a social networking program. 3GPP Layers correspond to functions of an application program for using a ProSe discovery service regulated according to 3GPP.

A ProSe direct discovery between the terminal A and the terminal B may perform a following procedure.

1. First, the terminal A performs regular application-Layer communication with an application server. The above communication is performed based on Application programming interface (API).

2. A ProSe enabled application program of the terminal A receives a list of application layer IDs having a friend relationship. The application layer ID may generally be in the form of a network access ID. For example, an application layer ID of the terminal A may have a form such as adam@example.com.

3. A terminal A requests private expression codes for a user and private expression codes for a friend of the user.

4. 3GPP layers transmit an expression code request to a ProSe server.

5. The ProSe server map application layer IDs provided from an operator or a third application server to private expression codes. For example, an application layer ID such as adam@example.com. The mapping may be performed based on parameters (e.g., mapping algorithms, key values, and the like) received from an application service of the network.

6. The ProSe server responds the obtained expression codes to the 3GPP layers. The 3GPP layers report that expression codes with respect to the requested application layer are successively received to the ProSe enabled application program. Further, a mapping table between the application layer IDs and the expression codes are generated.

7. The ProSe enabled application program requests the 3GPP layers to start the discovery procedure. That is, when one of friends is located close to the terminal A and direct communication may be performed, the ProSe enabled application program attempts the discovery. 3GPP layers announce a private expression code of the terminal A (that is, "GTER543$#2FSJ67DFSF" which is a private expression code of adam@example.com in the above example). In mapping of an application layer ID of a corresponding application program and the private expression code, the mapping relationship may be known by the previously received friends, and the mapping may be performed.

8. It is assumed that the terminal B is operating the same ProSe enabled application program as that of the terminal A, and the above steps 3 to 6 may be executed. 3GPP layers included in the terminal B may perform ProSe discovery.

9. When the terminal B receives the above announce from the terminal A, the terminal B determines whether the private expression code included in the announce is known by the terminal B or is mapped to an application layer ID. As illustrated in step 8, since the terminal B performs steps 3 to 6, the terminal B knows a private expression code with respect to the terminal A, mapping of the private expression code to the application layer ID, and which is a corresponding application program. Accordingly, the terminal B may discover the terminal B from the announce of the terminal A. The 3GPP layers in the terminal B announces that adam@example.com is discovered to the ProSe enable application program.

FIG. 13 illustrates a discovery procedure by taking into consideration the terminals A and B, the ProSe server, and the application server. Only an operation side between the terminals A and B is described. The terminal A transmits a signal called the announce (the procedure may refer to announcement), and the terminal B receives the announce to discover the terminal A. That is, a discovery procedure of FIG. 13 in an operation directly related to another terminal among operations performed by each terminal may refer to a single step discovery procedure may refer to a single step discovery procedure in a side of one step.

Figure 14:
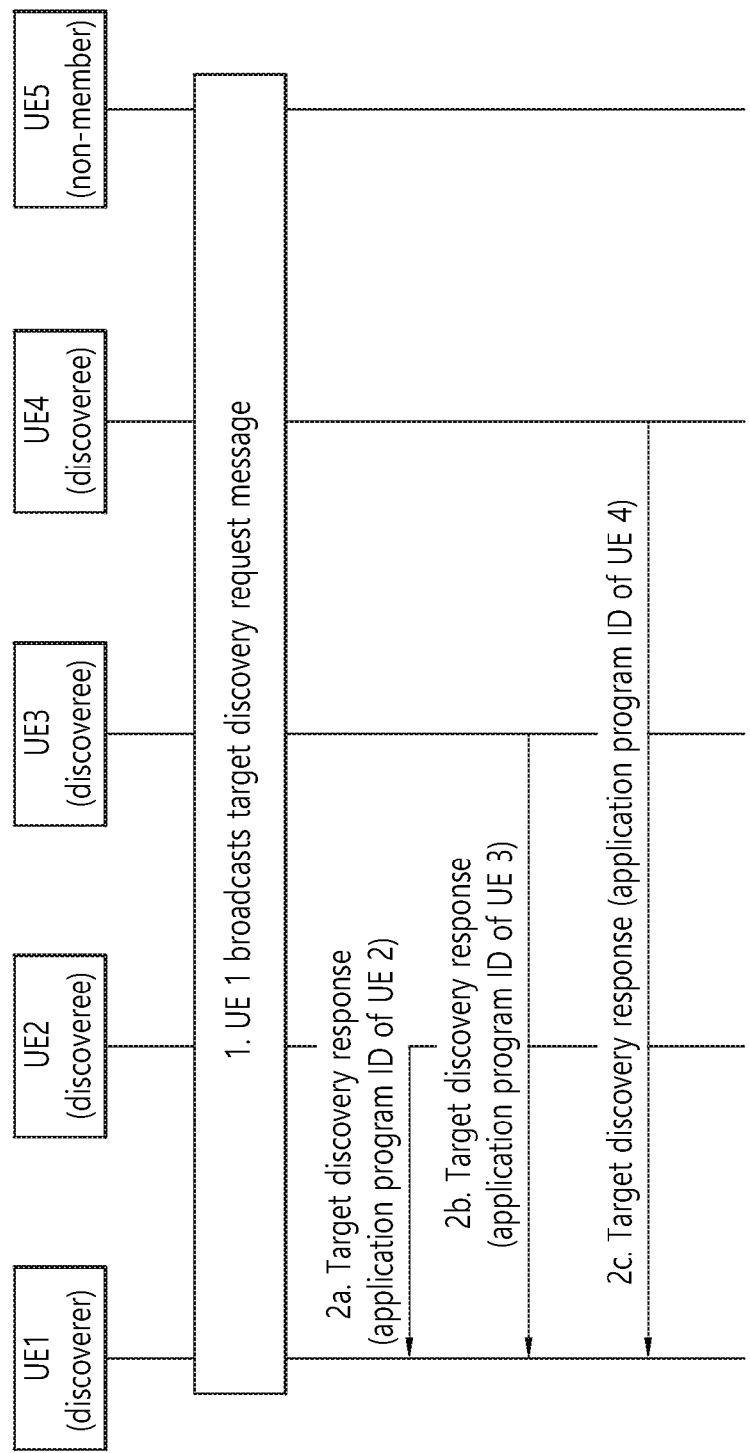
FIG. 14 illustrates another embodiment of a ProSe direct discovery procedure.

FIG. 14 illustrates another embodiment of a ProSe direct discovery procedure.

In FIG. 14, it is assumed that the terminal 1 to the terminal 4 may be included in a specific group communication system enablers (GCSE) group. It is assumed that the terminal 1 is a discoverer and terminals 2, 3, and 4 are a discoveree. A terminal 5 is a terminal regardless of a discovery procedure.

The terminal 1 and the terminals 2 to 4 may perform a following operation in a discovery procedure.

First, the terminal 1 broadcasts a targeted discovery request message (hereinafter referred to 'discovery request message' or 'M1') in order to discover whether an optional terminal included in the GCSE group is located around the terminal 1. The targeted discovery request message may include a unique application program group ID or a layer-2 group ID of the specific GCSE group. Further, the targeted discovery request message may include a unique ID of the terminal 1, that is, an application program private ID. The targeted discovery request message may be received by the terminals.

The terminal 5 transmits no response messages. The terminals 2, 3, and 4 included in the GCSE group transmit a targeted discovery response message (hereinafter referred to as a discovery response message or M2) as a response to the targeted discovery request message. The targeted discovery response message may include a unique application program private ID of a terminal transmitting the message.

An operation of terminals in a ProSe discovery procedure illustrated in FIG. 14 will be described. A discoverer (UE 1) transmits the targeted discovery request message, and receives a targeted discovery response message being a response thereto. In addition, if a discoveree (e.g., UE 2) receives the targeted discovery request message, the discoveree transmits a targeted discovery response message as a response thereto. Accordingly, each terminal performs an operation a second step. In the above side, a ProSe discovery procedure of FIG. 14 may refer to a discovery procedure.

In addition to the discovery procedure illustrated in FIG. 14, if the terminal 1 (discoverer) transmits a discovery confirm message (hereinafter may refer to M3) as a response to the targeted discovery response message, this may refer to a third step discovery procedure.

Hereinafter, the present invention is described.

Suppose that a UE, which has established RRC connection with a network, transmits a signal based on a D2D operation using resources scheduled by the network. Here, the UE may have a problem in the connection with the network during the D2D operation and thus may not be assigned resources scheduled by the network to be used for signal transmission based on the D2D operation any more. Accordingly, the D2D operation may be stopped.

For easier understanding, suppose that a UE is set to mode 1, that is, a UE is configured for D2D transmission scheduled by a network. When the UE connected to the network has a problem in the connection or fails to be connected to the network, the UE may not acquire a schedule for mode-1 D2D transmission from the network. In this case, the UE is not allowed to perform mode-1 D2D transmission, resulting in a D2D transmission stoppage.

More specifically, when the UE attempts to establish RRC connection for D2D transmission but fails in RRC connection, D2D transmission may not be started. When the network allows D2D transmission using only a resource indicated by a UE-specific configuration in D2D transmission of the UE, if the UE in the RRC idle state fails in an RRC connection establishment procedure for establishing RRC connection, the UE is not allowed to start D2D transmission until a next RRC connection establishment procedure is successful.

When D2D transmission is used mainly for public safety, the reliability of D2D transmission is crucial. However, a problem is that D2D transmission is stopped or D2D transmission is not allowed to start. The present invention provides a method and an apparatus for minimizing the occurrence of such a stoppage.

According to the present invention, a D2D transmission operation of a UE may be divided into mode 1 of performing D2D transmission in a normal condition and mode 2 of performing D2D transmission in a specific abnormal condition other than the normal condition.

According to illustrative definitions of mode 1 and mode 2, mode-1 transmission may be defined to mean that a D2D signal (control information and/or data on a D2D operation) is transmitted via a resource scheduled by a network. Mode-2 transmission may be defined to mean that a D2D signal is transmitted using a resource determined autonomously by a UE in a certain resource pool. Since it is generally possible for the network to perform scheduling when a UE is in the RRC connected state, modes are classified to suggest an operation in which a UE autonomously determines a resource to perform D2D transmission exceptionally in a situation where the UE cannot receive scheduling for D2D transmission from the network.

The foregoing definitions may be generalized as follows. That is, mode-1 transmission is general transmission of transmitting a D2D signal using a resource indicated by a network in a normal state, and mode-2 transmission is exceptional transmission of transmitting a D2D signal using an exceptional resource in an exceptional condition other than the normal condition. For example, when the network sets D2D transmission to be allowed only in the RRC connected state, mode-1 transmission may refer to a general transmission mode in which a UE in the RRC idle state is not allowed to perform D2D transmission, and mode-2 transmission may refer to an exceptional transmission mode in which a UE in the RRC idle state is exceptionally allowed to perform D2D transmission.

According to different illustrative definitions of mode 1 and mode 2, mode-1 transmission may be defined such that a UE determines a transmission resource among resources applied to a general situation among resources indicated by a network to transmit a D2D signal, and mode-2 transmission may be defined such that a UE determines a transmission resource among resources indicated by a network to transmit a D2D signal in an exceptional situation. When a resource indicated by the network is set for a UE in the RRC idle state to use, the above definitions may be applied when the UE is in the RRC idle state. When a resource indicated by the network is set for a UE in the RRC connected state to use, the above definitions may be applied when the UE is in the RRC connected state.

An operation of the UE switching from mode 1 to mode 2 according to the foregoing definitions is possible only in a case where a D2D transmission resource available in mode 2 is configured for the UE. A network may set, for the UE, a D2D resource available for the UE in mode 2 through broadcasting or user-specific signaling.

Hereinafter, conditions for which the UE is allowed to autonomously perform mode switching from mode 1 to mode 2 or from mode 2 to mode 1 are described. Although the term "mode switching" is used hereinafter for the convenience of description, this term is ultimately to indicate how a resource used for D2D signal transmission is determined.

First, timers available in the present invention are described. The following table illustrates various timers used in the present invention.

TABLE 2

| Timer | Start | Stop | At expiry |
| --- | --- | --- | --- |
| T300 | Transmission of RRCConnectionRequest | Reception of RRCConnectionSetup or RRCConnectionReject message, cell re-selection and upon abortion of connection establishment by upper layers | Upon performing MAC resetting, MAC setup release, and RLC re-establishment |
| T301 | Transmission of RRCConnectionReestablishmentRequest | Reception of RRCConnectionReestablishment or RRCConnectionReestablishmentReject message as well as when the selected cell becomes unsuitable | Proceed in RRC_IDLE state |
| T304 | Reception of RRCConnectionReconfiguration message | Criterion for successful completion of handover with E-UTRA, handover to E-UTRA or cell change order is met | When a cell is changed through a handover, initiate RRC connection re-establishment |
| T310 | Upon detecting physical layer problem for the PCell | Reception of indication information to trigger handover and to initiate RRC connection re-establishment procedure | Proceed in RRC_IDLE state or initiate RRC connection re-establishment procedure |

TABLE 2-continued

| Timer | Start | Stop | At expiry |
|---|---|---|---|
| T311 | Upon initiating the RRC connection re-establishment procedure | Selection of a suitable E-UTRA cell or cell using another RAT | Go into RRC-IDLE state |

Hereinafter, conditions for which a UE is allowed to autonomously switch a mode from mode 1 to mode 2 are described. Suppose that the UE is in mode 1 hereinafter.

First, when failing in RRC connection establishment, the UE may switch the mode from mode 1 to mode 2. When the UE attempts RRC connection establishment to perform D2D transmission but fails in RRC connection establishment, the UE may switch to mode 2 in order to initiate D2D transmission.

When the UE starts RRC connection establishment, a specific timer may start. This timer is stopped when RRC connection establishment succeeds. When the timer expires, the UE may determine that RRC connection establishment failed. When the timer expires, the UE may switch the D2D operation mode from mode 1 to mode 2 to initiate/resume D2D transmission.

When the value of the timer used for the UE to determine whether RRC connection establishment fails determines time for the UE to initiate/resume D2D transmission when the UE fails in RRC connection establishment. The value of the timer is generally set to be very small in order to sufficiently guarantee an RRC connection establishment attempt of the UE, which is not preferable. However, as the timer is set to have a greater value, time to initiate/resume D2D transmission when the UE fails in RRC connection establishment is also delayed. To avoid such a problem, the UE may initiate/resume D2D transmission before RRC connection establishment fails. In this case, the UE may start a separate timer simultaneously with the conventional timer when starting an RRC connection establishment procedure. The separate timer may have a shorter length than the conventional timer. When the separate timer expires before RRC connection establishment fails, the UE may switch from mode 1 to mode 2 and accordingly may quickly initiate/resume D2D transmission.

Suppose that the timer is $T300_{D2D}$. Time indicated by $T300_{D2D}$ may be shorter than time indicated by T300 described in Table 2. Then, when $T300_{D2D}$ expires, the UE may perform autonomous mode switching from mode 1 to mode 2, without considering that RRC connection establishment fails. As a result, the UE may perform autonomous mode switching from mode 1 to mode 2 before declaring the failure of RRC connection establishment.

Figure 16:
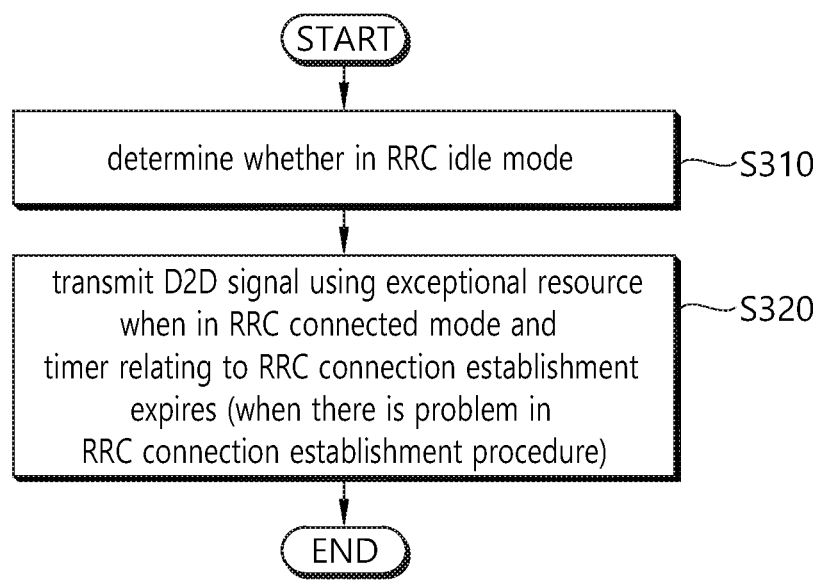
FIG. 16 illustrates a D2D operation method of a UE according to another embodiment of the present invention.

When the network signals a D2D transmission resource through broadcast system information, in which T300 expires, the UE may perform mode-2 transmission of transmitting a D2D signal using a resource available under an exceptional condition (for example, an exceptional resource) among resources indicated by the system information broadcast by the network, instead of mode-1 transmission of transmitting a D2D signal using a resource indicated by the broadcast system information, which will be described with reference to FIG. 16.

When the network does not signal a D2D transmission resource via broadcasting, in which T300 expires, the UE may perform mode-2 transmission of transmitting a D2D signal in the RRC idle state using a resource available under an exceptional condition (for example, an exceptional resource) among resources indicated by the network, instead of mode-1 transmission not allowed in the RRC idle state.

The value of the timer may be signaled by the network. Alternatively, the value of the timer may be set in advance. The network may indicate through the system information whether the UE is allowed to apply the operation described with reference to the timer ($T300_{D2D}$). Alternatively, the UE may switch from mode 1 to mode 2 when failing in RRC connection reestablishment.

Further, the UE may switch from mode 1 to mode 2 when a timer, which is started upon detecting a physical layer problem, expires. Suppose that this timer is $T310_{D2D}$. Time indicated by $T310_{D2D}$ may be shorter than time indicated by T310 described in Table 2. Then, when $T310_{D2D}$ expires, the UE may perform autonomous mode switching from mode 1 to mode 2 without declaring RFL. More specifically, after $T310_{D2D}$ expires, before T310 expires, that is, while T310 is running, the UE may perform mode-2 transmission of transmitting a D2D signal using an exceptional resource under an exceptional condition, instead of mode-1 transmission of transmitting a D2D signal using a resource scheduled by the network, which will be described in detail with reference to FIG. 15. As a result, the UE may perform autonomous mode switching from mode 1 to mode 2 before declaring RLF. The value of the timer may be signaled by the network. Alternatively, the value of the timer may be set in advance. The network may indicate through the system information whether the UE is allowed to apply the operation described with reference to the timer ($T310_{D2D}$).

In addition, the UE may switch from mode 1 to mode 2 when a timer, which is started upon receiving a handover instruction, expires. This separate timer may be $T304_{D2D}$. Time indicated by $T304_{D2D}$ may be shorter than time indicated by T304 described in Table 2. Then, when $T304_{D2D}$ expires, the UE does not declare handover failure, and may perform autonomous mode switching from mode 1 to mode 2 before declaring handover failure due to the expiry of T304. The value of the timer may be signaled by the network or may be set in advance. The network may indicate through the system information whether the UE is allowed to apply the operation described with reference to the timer ($T304_{D2D}$).

Moreover, the UE may switch from mode 1 to mode 2 when starting the RRC connection reestablishment procedure due to handover failure, RLF, RRC connection reconfiguration failure, and the like.

In addition, the UE may perform mode switching from mode 1 to mode 2 when starting RRC connection reestablishment.

The operation of the UE switching from mode 1 to mode 2 for a D2D operation may be performed only in a case a D2D signal to be transmitted includes specific information. For example, when D2D transmission is communication for public safety, the UE may be allowed to perform the above operation. Alternatively, when D2D transmission is for exchanges of messages including operating information/safety information/emergency information on cars via direct communications between cars, the UE may be allowed to perform the above operation. It is also possible, for the UE, to set conditions or rules for indicating traffic in which the operation is allowed depending on traffic types or quality of service (QoS) requirements of traffic.

It is also possible to apply different mode switching conditions according to information in a D2D signal for the UE to transmit. For example, the UE may use different mode switching conditions when a D2D signal carries information for controlling a D2D operation between two UEs and when a D2D signal carries user data, such as audio or video data, between two UEs. Since control information generally has higher priority than user data, an active mode switching condition (mode switching is allowed upon attempt at RRC connection establishment) may be applied for a D2D signal including control information in order to minimize D2D transmission stoppage or a delay in initiating D2D transmission.

Hereinafter, a time period for a condition for mode switching from mode 1 to mode 2 is described. The time period may be realized by a timer.

For example, when the UE has data to transmit through D2D transmission, the timer may be started. Further, when the UE receives, from an upper layer, data to transmit through D2D transmission, the timer may be started. In addition, when the UE detects a physical layer problem, the timer may be started. Moreover, when the UE detects RLF, the timer may be started. It is also possible that the timer is applied to traffic satisfying specific traffic or specific QoS requirements. That is, it is possible to apply the timer to traffic having specific priority among prioritized traffics. For example, it is possible to apply the timer in an exceptional case occurring when transmitting messages including operating information/safety information/emergency information on cars via direct communications between cars. It is also possible apply different timer values according to traffic types or QoS requirements. The foregoing conditions for starting various timers may be used alone or in combinations. When the time period based on the timer expires, the UE may perform mode switching from mode 1 to mode 2.

Meanwhile, one or a plurality of conditions for stopping the timer may be considered.

For example, when the UE has a D2D transmission opportunity and accordingly transmits data via D2D transmission, the timer is stopped. In addition, when RRC connection including D2D configuration that allows the UE to perform D2D transmission is established, the timer is stopped.

The value of the timer may be signaled by the network. For example, the value of the timer may be broadcast by the network or be indicated through a UE-specific signal. Alternatively, the value of the timer may be set in advance for the UE. When the value of the timer is signaled by the network, the value of the timer set in advance for the UE may be replaced with the value of the timer signaled by the network.

Hereinafter, resource selection in mode switching from mode 1 to mode 2 is described.

When the UE determines autonomous mode switching from mode 1 to mode 2, if the UE has valid resource information for mode 2, the UE uses a resource for mode 2 defined by the resource information. Here, the valid resource information may refer to an exceptional resource used for the transmission of a D2D signal in an exceptional condition when the UE is in the RRC connected state. Alternatively, the valid resource information may refer to an exceptional resource applied for D2D signal transmission only in an exceptional condition among resources indicated by the system information broadcast by the network when the UE is in the RRC idle state. The valid resource information may be broadcast via an SIB or be provided via a dedicated signal to the UE by the network.

When the UE determines autonomous mode switching from mode 1 to mode 2, if the UE has no valid resource information for mode 2, the UE may use a predetermined resource for mode-2 transmission. The predetermined resource may refer to a resource preset through a Universal Subscriber Identity Module (USIM) of the UE or internal storage medium, not a resource signaled by the network including a BS.

When a condition for mode switching from mode 1 to mode 2 is satisfied and the UE receives or transmits data for a D2D operation through a valid resource for mode 1, the UE may defer mode switching from mode 1 to mode 2 until the resource becomes invalid or all scheduled D2D transmissions/receptions are finished.

Hereinafter, specific applications of the present invention to a UE supporting a D2D operation are illustrated. First, it is described that the UE performs mode-2 transmission of transmitting a D2D signal using an exceptional resource in an exceptional condition, instead of mode-1 transmission of transmitting a D2D signal using a resource scheduled by a network, while T310 is running. Hereinafter, suppose that the UE is located within cell coverage at a frequency used for D2D communication.

Figure 15:
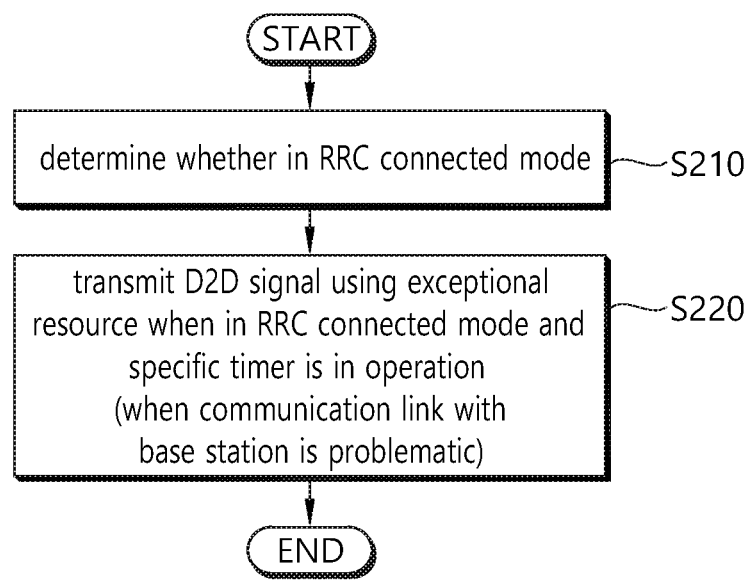
FIG. 15 illustrates a D2D operation method of a UE according to one embodiment of the present invention.

FIG. 15 illustrates a D2D operation method of a UE according to one embodiment of the present invention.

Referring to FIG. 15, the UE determines whether the UE is in the RRC connected mode (S210).

When the UE is in the RRC connected mode and a specific timer is running, the UE transmits a D2D signal using an exceptional resource (S220). Here, the D2D signal may be control information and/or data for the D2D operation. The specific timer may be T310 or T311 illustrated in Table 2. That is, the specific timer may be a timer that is started when the UE detects a physical layer problem, a timer that is started when the UE starts a cell selection process after declaring RLF, or a timer that is started when the UE selects a cell and transmits an RRC connection reestablishment request message after declaring RLF. Therefore, the specific timer that is running may mean that there is a problem in a communication link between the UE and a BS.

For example, the UE may transmit a D2D signal using an exceptional resource from when T310 is started upon detecting a physical layer problem in a primary cell to when T310 expires or from when T311 is started upon starting an RRC connection reestablishment procedure due to RLF to when T311 expires.

The exceptional resource may be included in system information broadcast by the primary cell in which the physical layer problem or RLF is detected. Alternatively, the exceptional resource may be included in system information broadcast by a cell in which the UE starts an RRC connection reestablishment procedure.

The following table illustrates system information including the exceptional resource.

TABLE 3

```
-- ASN1START
SystemInformationBlockType18-r12 ::= SEQUENCE {
    commConfig-r12                SEQUENCE {
    commRxPool-r12                SL-CommRxPoolList-r12,
    commTxPoolNormalCommon-r12    SL-CommTxPoolList-r12    OPTIONAL,-- Need OR
    commTxPoolExceptional-r12     SL-CommTxPoolList-r12    OPTIONAL,-- Need OR
    commSyncConfig-r12            SL-SyncConfigList-r12    OPTIONAL-- Need OR
    }                                                      OPTIONAL,-- Need OR
    lateNonCriticalExtension      OCTET STRING                OPTIONAL,
    ...
}
-- ASN1STOP
```

In Table 3, 'commRxPool' indicates resources allowed for the UE to receive a D2D signal in the RRC idle state and RRC connected state. 'commTxPoolNormalCommon' indicates resources allowed for the UE in the RRC idle state to transmit a signal based on D2D communication or resources allowed for the UE in the RRC connected state to transmit a signal based on a D2D operation through a frequency other than a primary frequency. 'commTxPoolExceptional' indicates resources allowed for the UE to transmit a signal based on D2D communication in an exceptional condition. That is, while the UE basically uses resources indicated by 'commTxPoolNormalCommon' to transmit a signal based on a D2D operation, the UE may transmit a signal based on D2D communication using an exceptional resource, that is, a resource indicated by 'commTxPoolExceptional,' in an exceptional condition, for example, in the RRC connected mode and during the operation of a specific timer as illustrated in FIG. 15. When the UE determines that a communication link is recovered, the UE may stop using the exceptional resource. Here, the recovery of the communication link may mean that the physical layer problem is resolve or the RRC connection reestablishment procedure is completed.

Next, described is an application of a method of performing mode-2 transmission of transmitting a D2D signal using an exceptional resource applied only in an exceptional condition among resources indicated by system information broadcast by a network, instead of mode-1 transmission of transmitting a D2D signal using a common resource applied in a general condition among the resources indicate by the system information broadcast by the network, after T300 expires. Suppose that the UE is located within cell coverage at a frequency used for D2D communication.

FIG. 16 illustrates a D2D operation method of a UE according to another embodiment of the present invention.

Referring to FIG. 16, the UE determines whether the UE is in the RRC idle mode (S310).

When the UE is in the RRC idle mode and a timer relating to RRC connection establishment expires, the UE transmits a D2D signal using an exceptional resource (S320). Here, the timer relating to RRC connection establishment may be T300 illustrated in Table 2. That is, when there is a problem in the RRC connection establishment procedure, the UE may transmit a D2D signal using an exceptional resource. The D2D signal may be control information and/or data for a D2D operation.

For example, while performing a D2D operation, the UE in the RRC idle state may transmit an RRC connection request (RRCConnectionRequest) to a cell in order to transition to the RRC connected state. When the RRC connection request is transmitted, T300 is started. However, when the UE does not receive a message of 'RRCConnectionSetup' or 'RRCConnectionReject' from the cell until T300 expires, the UE performs MAC resetting, MAC configuration release, and RLC reestablishment. In this case, it is necessary to specify a resource to be used for the D2D operation that the UE is performing.

That is, it is necessary to specify which resource the UE uses to perform a D2D operation, specifically, D2D communication, until receiving 'RRCConnectionReconfiguration' including a configuration for the D2D operation from the cell after T300 expires.

In the present invention, if system information broadcast by the cell includes information on the exceptional resource, it is proposed that the UE performs D2D communication using the exceptional resource during that period. The cell may be a cell in which the UE starts the RRC connection establishment procedure. That is, the cell may be a cell to which the UE transmits the RRC connection request.

The system information including the exceptional resource is illustrated in Table 3. The UE basically uses resources indicated by 'commTxPoolNormalCommon' in Table 3 to transmit a signal based on a D2D operation, while the UE may transmit a signal based on D2D communication using an exceptional resource, that is, a resource indicated by 'commTxPoolExceptional' in Table 3, in an exceptional condition, for example, in the RRC idle mode and at the expiry of the timer relating to RRC connection establishment as illustrated in FIG. 16. More specifically, the UE may transmit a signal based on D2D communication using a resource indicated by 'commTxPoolExceptional' in Table 3 during a period from when the timer relating to RRC connection establishment expires to when receiving 'RRCConnectionReconfiguration' including a configuration for a D2D operation. The UE may stop using the exceptional resource when receiving a UE-specific D2D configuration as a result of succeeding in the RRC connection establishment procedure or receiving an RRC connection release instruction.

Figure 17:
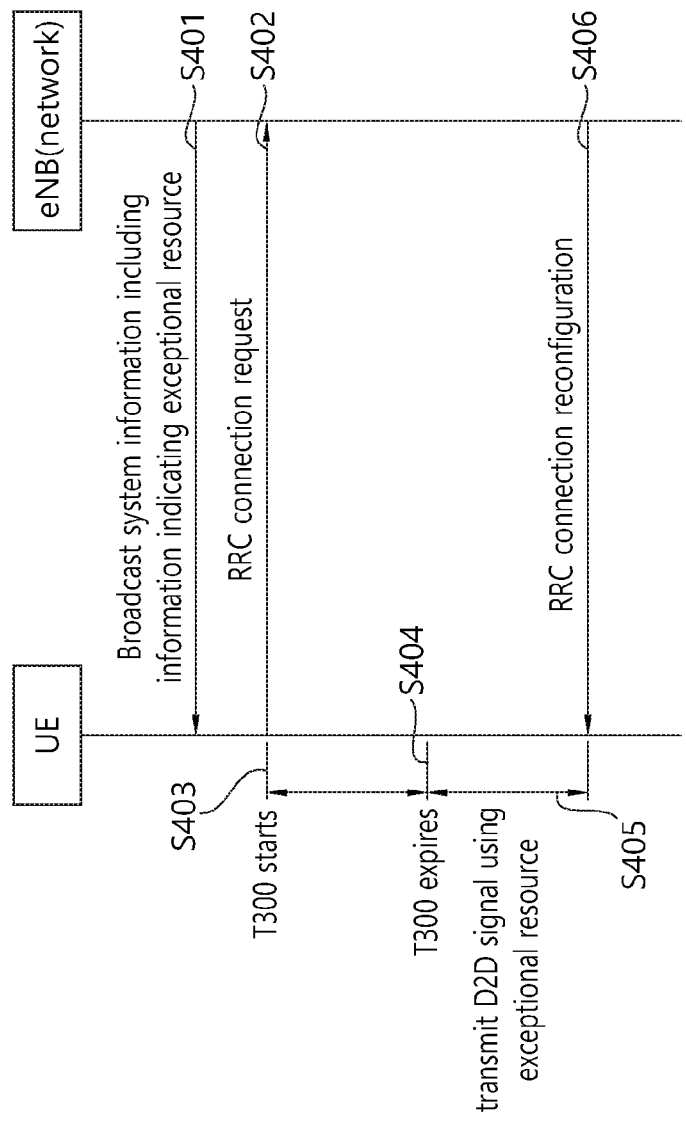
FIG. 17 illustrates that the method illustrated in FIG. 16 is applied to a UE in the RRC idle state.

FIG. 17 illustrates that the method illustrated in FIG. 16 is applied to a UE in the RRC idle state.

Referring to FIG. 17, a network broadcasts system information including information indicating an exceptional resource (S401). The system information is illustrated in Table 3.

A UE in the RRC idle state transmits an RRC connection request to the network (S402).

When the RRC connection request is transmitted, T300 of the UE is started (S403).

The UE may receive no RRC connection setup message from the network during a time indicated by T300. That is, T300 expires (S404).

The UE transmits a D2D signal using the exceptional resource during a period from when T300 expires to when receiving an RRC connection reconfiguration from the network (S405).

Hereinafter, conditions for which a UE is allowed to autonomously perform mode switching from mode 2 to mode 1 are described.

For example, suppose that a UE that cannot acquire a schedule from a network autonomously performs mode switching from mode 1 to mode 2 in order to perform D2D transmission. In this case, if the situation is changed so that the UE can acquire a schedule from the network, the UE may need to perform mode switching from mode 2 back to mode 1.

One or a plurality of the following conditions for allowing mode switching from mode 2 to mode 1 may be considered.

When a predetermined period of time expires, a UE operating in mode 2 may perform mode switching from mode 2 to mode 1. For example, the UE, which has autonomously performed modes switching from mode 1 to mode 2, may autonomously perform mode switching from mode 2 to mode 1 when a predetermined period of time expires.

Also, when the UE recovers from a cause of mode switching from mode 1 to mode 2, that is, various failures, the UE may perform mode switching from mode 2 to mode 1. For example, when RRC connection reestablishment is completed, the UE may perform mode switching from mode 2 to mode 1.

Hereinafter, a time period for a condition for mode switching from mode 2 to mode 1 is described. The time period may be realized by a timer.

When the UE autonomously performs mode switching from mode 1 to mode 2, the timer may be started. One or two or more of the following conditions need to be satisfied to stop the timer.

When the UE receives a D2D configuration specific to the UE from the network, the UE may stop the timer. This condition may means that the UE stops the timer when detecting that the UE is controlled by the network.

Further, when the UE receives a dedicated configuration (that is, not a dedicated D2D configuration) from the network, the UE may stop the timer. The UE may receive the dedicated configuration through an upper layer, such as an RRC or MAC layer, or may receive the dedicated configuration through a lower layer, such as a physical layer. This condition may also mean that the UE stops the timer when detecting that the UE is controlled by the network.

When the timer is stopped and the UE is in the RRC connected state, the UE returns from mode 2 to mode 1.

Meanwhile, before a maximum time period allowed for the UE expires, the foregoing problematic situation, that is, RLF or a detected physical layer problem, may be resolved. In this case, even though the UE is allowed to immediately return from mode 2 to mode 1, it is simple and favorable to determine whether the UE returns to mode 1 based on the expiry of the maximum time period (using a timer), because frequent mode switching may cause rather a stoppage of a D2D operation of the UE. Therefore, the conditions for stopping the timer may not necessarily be specified.

An operation of a timer is described relating to the mobility of a UE (cell selection, cell reselection, or handover). The UE may start timer B in cell A as a base of a D2D operation. The UE may change a cell (from cell A to cell B) according to mobility. In this change process, timer B is kept running to allow the UE to maintain an operation in mode 2. Accordingly, too frequent mode switching, which may cause a stoppage of the D2D operation, may be avoided.

For another example, suppose that a UE may start timer B in cell A as a base of a D2D operation and the UE changes a cell due to mobility. In this case, the UE may stop and reset timer B in order to strictly follow a network configuration in a new cell.

When a condition for mode switching from mode 2 to mode 1 is satisfied and the UE receives or transmits data on a D2D operation through a valid resource for mode 2, the UE may defer mode switching from mode 2 to mode 1 until the resource becomes invalid or all scheduled D2D transmissions/receptions are finished.

Meanwhile, although a D2D transmission resource is configured to be scheduled by a network for a UE, the UE may not receive the schedule from the network despite having data to transmit via D2D. As a result, transmission opportunities of the UE are unavailable, and accordingly D2D transmission may be stopped or may not be started. This situation may result in a stoppage of the D2D operation, causing a problem in the reliability of the D2D operation.

Figure 18:
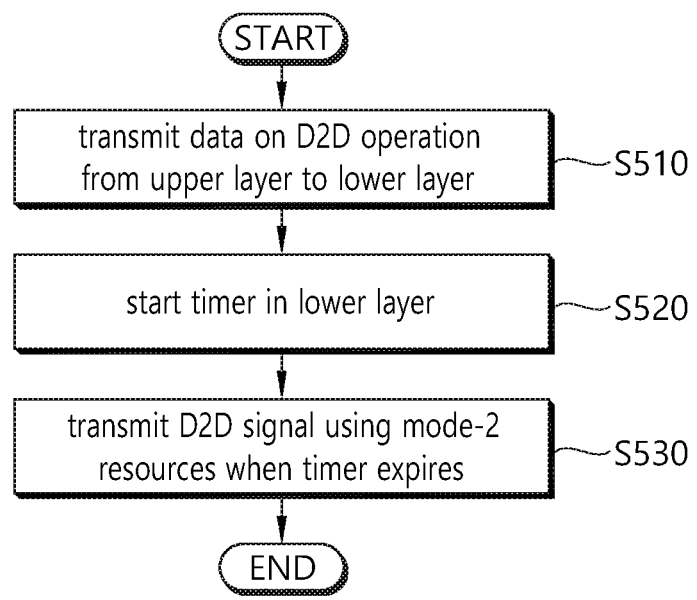
FIG. 18 illustrates a D2D operation method of a UE according to one embodiment of the present invention.

FIG. 18 illustrates a D2D operation method of a UE according to one embodiment of the present invention.

Referring to FIG. 18, the UE transmits data on a D2D operation from an upper layer to a lower layer (S510). The data may be a service data unit (SDU). Here, the upper layer may be an RRC layer. The lower layer may be layer 2, such as PDCP, RLC, or MAC layers. Suppose that the UE is set in mode 1.

The UE starts a timer in the lower layer (S520). The UE may transmit data, such as an SDU, from the upper layer to the layer in order to transmit data on a D2D operation. Whenever the upper layer transmits data on a D2D operation to the lower layer, the lower layer starts the timer. The timer may be defined, for example, in a PDCP layer. In this case, time indicated by the timer needs to be shorter than time indicated by a discard timer used to determine discarding of the SDU. The timer is stopped when the SDU is successfully transmitted to another UE through a D2D operation.

The UE transmits a D2D signal using mode-2 resources when the timer is not stopped but expires (S530). The mode-2 resources may be the exceptional resources illustrated in FIGS. 15 and 16. Alternatively, the mode-2 resources may be preset for the UE or be autonomously selected by the UE from a predetermined resource pool.

For example, when the timer expires, the UE may consider that a condition for mode switching from mode 1 to mode 2 is satisfied. Then, the UE may transmit a D2D signal using the mode-2 resources after the timer expires.

Alternatively, even though the timer expires, the UE may consider that mode 1 remains set and may use the mode-2 resources only until a corresponding SDU is successfully transmitted.

Figure 19:
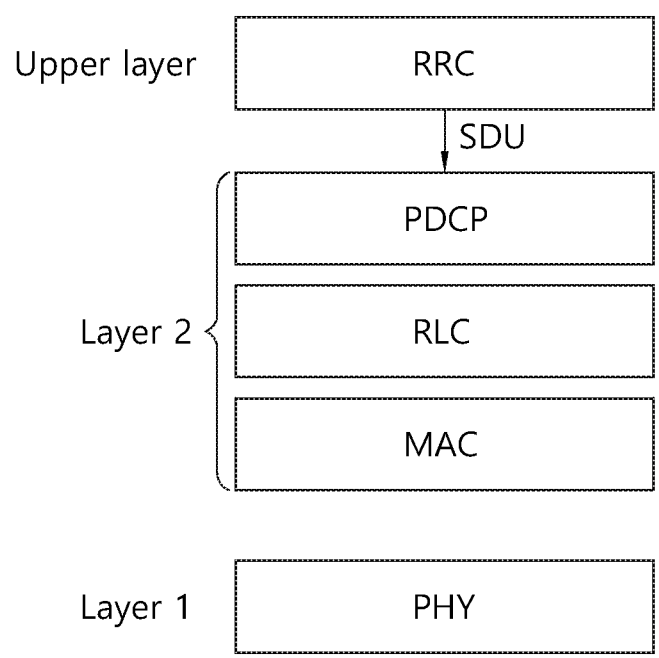
FIG. 19 illustrates an application of the method of FIG. 18.

FIG. 19 illustrates an application of the method of FIG. 18.

Referring to FIG. 19, a UE transmits an SDU from an RRC layer as an upper layer to a PDCP layer as a lower layer. In this case, the PDCP layer starts a timer. When the UE transmits the SDU to another UE through a D2D operation within time indicated by the timer, the timer is stopped. However, when the UE does not transmit the SDU to another UE through a D2D operation within the time, the timer expires.

Here, the UE may transmit the SDU using mode-2 resources, instead of discarding the SDU.

Figure 20:
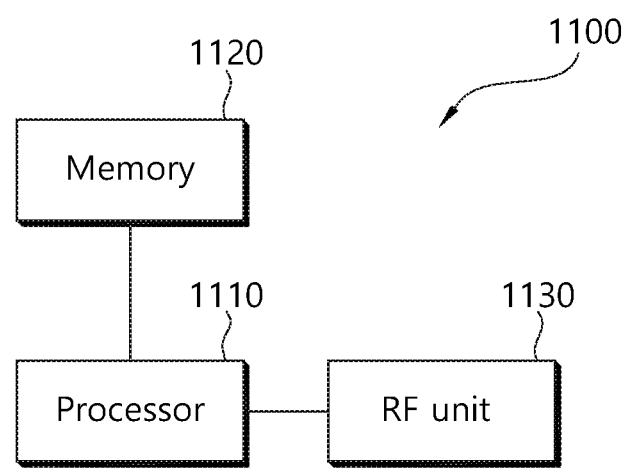
FIG. 20 is a block diagram of a UE according to an embodiment of the present invention.

FIG. 20 is a block diagram of a UE according to an embodiment of the present invention.

Referring to FIG. 20, the UE 1100 includes a processor 1110, a memory 1120, and a radio frequency (RF) unit 1130. The processor 1110 implements the proposed functions, processes, and/or methods. For example, the processor 1110 determines whether there is a problem in a communication link with a BS, and transmits a D2D signal using an exceptional resource when it is determined that there is a problem in the communication link with the BS.

The RF unit 1130 is coupled to the processor 1110 and transmits and receives a radio signal.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing device-to-device (D2D) operation in a wireless communication system, the method performed by a user equipment (UE) and comprising:
   determining whether a radio link failure is detected while the D2D operation is performed using a first type resource scheduled by a base station (BS);
   performing the D2D operation on a second type resource, which is autonomously selected by the UE in a resource pool, when the radio link failure is detected;
   starting a specific timer when the UE performs the D2D operation on the second type resource;
   determining whether the UE receives a configuration for the D2D operation from the BS while the specific timer is running;
   stopping the specific timer when the UE receives the configuration for the D2D operation from the BS; and
   performing the D2D operation on the first type resource scheduled by the BS upon stopping the specific timer,
   wherein the UE determines that the radio link failure is detected when a timer, which is started upon detecting a physical layer problem, expires.

2. The method of claim 1, wherein the second type resource is indicated by system information.

3. The method of claim 2, wherein the system information is broadcast by a primary cell of the UE or a cell in which the UE starts a radio resource control (RRC) connection reestablishment procedure.

4. The method of claim 1, wherein the UE is in a radio resource control (RRC) connected state.

5. A user equipment (UE) for performing device-to-device (D2D) operation, the UE comprising:
   a radio frequency (RF) transceiver that transmits and receives a radio signal; and
   a processor connected to the RF transceiver to operate, wherein the processor is configured to:
   determine whether a radio link failure is detected while the D2D operation is performed using a first type resource scheduled by a base station (BS);
   perform the D2D operation on a second type resource, which is autonomously selected by the UE in a resource pool, when the radio link failure is detected;
   start a specific timer when the UE performs the D2D operation on the second type resource;
   determine whether the UE receives a configuration for the D2D operation from the BS while the specific timer is running;
   stop the specific timer when the UE receives the configuration for the D2D operation from the BS; and
   perform the D2D operation on the first type resource scheduled by the BS upon stopping the specific timer,
   wherein the UE determines that the radio link failure is detected when a timer, which is started upon detecting a physical layer problem, expires.

6. The UE of claim 5, wherein the second type resource is indicated by system information.

7. The UE of claim 6, wherein the system information is broadcast by a primary cell of the UE or a cell in which the UE starts a radio resource control (RRC) connection reestablishment procedure.

8. The UE of claim 5, wherein the UE is in a radio resource control (RRC) connected state.

* * * * *